(12) United States Patent
Kolton

(10) Patent No.: US 9,237,786 B2
(45) Date of Patent: Jan. 19, 2016

(54) MOBILE DEVICE AND PERIPHERAL HARDWARE ATTACHMENT CASE

(71) Applicant: Timothy Val Kolton, Hollywood, CA (US)

(72) Inventor: Timothy Val Kolton, Hollywood, CA (US)

( * ) Notice: Subject to any disclaimer, the term of this patent is extended or adjusted under 35 U.S.C. 154(b) by 94 days.

(21) Appl. No.: 13/801,651

(22) Filed: Mar. 13, 2013

(65) Prior Publication Data

US 2014/0262850 A1 Sep. 18, 2014

(51) Int. Cl.
*A45C 15/00* (2006.01)
*A45C 11/00* (2006.01)
*H04B 1/3888* (2015.01)
*H04M 1/02* (2006.01)
*H04M 1/725* (2006.01)

(52) U.S. Cl.
CPC ............... *A45C 11/00* (2013.01); *A45C 15/00* (2013.01); *H04B 1/3888* (2013.01); *H04M 1/0254* (2013.01); *A45C 2011/002* (2013.01); *H04M 1/0235* (2013.01); *H04M 1/0262* (2013.01); *H04M 1/72558* (2013.01)

(58) Field of Classification Search
CPC .. A45C 11/00; A45C 15/00; A45C 2011/002; H04B 1/3888; H04M 1/0254; H04M 1/0235; H04M 1/0262

USPC .................. 206/1.5, 38, 305, 320, 468, 576
See application file for complete search history.

(56) References Cited

U.S. PATENT DOCUMENTS

| | | | | |
|---|---|---|---|---|
| 3,179,891 | A * | 4/1965 | Sharma | 206/38 |
| 4,933,988 | A * | 6/1990 | Thibault | 455/349 |
| 7,431,161 | B2 * | 10/2008 | Carlino | 206/581 |
| 8,302,769 | B2 * | 11/2012 | Justiss | 206/38 |
| 8,573,395 | B1 * | 11/2013 | Dafni et al. | 206/320 |
| 8,833,379 | B1 * | 9/2014 | Kaplan | 206/320 |
| 2009/0044825 | A1 * | 2/2009 | Lawrence et al. | 206/581 |
| 2009/0166247 | A1 * | 7/2009 | Gindi | 206/581 |

* cited by examiner

*Primary Examiner* — Luan K Bui
(74) *Attorney, Agent, or Firm* — Edwin Tarver; Lauson & Tarver LLP

(57) ABSTRACT

A mobile device and peripheral hardware case and holder comprises a panel section for attachment to the rear of peripheral hardware, such as a battery pack or amplifier. The panel member includes edges which slide in to rails of a mobile device case, which holds a mobile device, such as a cell phone or music player. The rails of the case include a stop for holding the panel section in an installed position, and a corresponding locking arrangement biases the holder in a locked position. When assembled, the holder preserves the connections of the mobile device and peripheral hardware in proximity to each other.

9 Claims, 12 Drawing Sheets

MOBILE DEVICE AND PERIPHERAL HARDWARE ATTACHMENT CASE

CROSS-REFERENCE TO RELATED APPLICATION

This application claims the benefit of the priority filing date of provisional application No. 61/728,745, filed Nov. 20, 2012.

BACKGROUND

Multi-function mobile devices, including cellular "smart phones" and audio players are well known in the art. These typically comprise sophisticated computing devices with a variety of functionality, including providing telephone service, location (GPS) information, and Internet service among others. A major use of such devices is for audio playback using headphones.

Because extended use of cellular signal for location services, and extensive processor use for mobile device applications uses considerable power these devices frequently lack sufficient battery power for lengthy periods of operation. Consequently, battery packs have been developed which attach to mobile devices, usually substantially increasing the weight and bulk of the device.

Headphones are frequently used with mobile devices for use while listening to music or gaming. To drive high-end performance headphones, such as over-ear headphones, and headphones designed for high fidelity sound, audiophiles frequently prefer to pair their mobile devices to digital audio converters (DACs). Current DACs include amplifiers for boosting audio signal, and in many cases, modifying signals according to predetermined or programmable equalization profiles.

The popularity of battery backs and DACs causes another issue to arise with the increased popularity of mobile devices, that of storage. Since mobile devices are typically larger than conventional cellular telephones, in particular due to a large interactive screen, users have trouble carrying both a mobile device, and a conventional wallet on their person, in addition to keys and other paraphernalia, conveniently.

Currently, there is no effective, convenient way of pairing DACs with mobile devices. Separate, but connected by cords, mobile devices and DACs are awkward to carry together and frequently come apart, resulting in unplugging of cabling, audio disruption, and potential damage to both the amplifier and mobile device. Users typically tie the devices together by improvising with a strap or rubber band. While battery packs that connect to mobile devices are known in the art, they are designed primarily for permanent attachment to a mobile device, making them heavy, unwieldy and cumbersome. Finally, the inclusion of a DAC or battery pack presents an unreasonable storage burden for conventional pants pockets when included with a wallet, keys, etc.

For this reason, there is a need in the art for a mobile device case and attachment capable of holding and protects the mobile device while allowing peripheral devices, such as battery packs, DACs and wallets to attach to the mobile device. There is also a need in the art for an attachment that allows the mobile device to remain encased, while allowing peripheral devices to be removed and reinstalled easily and efficiently as desired.

SUMMARY

An improved mobile device and peripheral hardware attachment apparatus includes a panel member that affixes to peripheral hardware for a mobile device, such as a battery pack, amplifier and digital to analog converter, or even a wallet having pockets for holding wallet-sized cards, and a case member which partially encloses a mobile device, such as an audio player, cell phone, or similar personal electronic apparatus. The case member includes access portals to all audio player controls, including the display and an opening for inserting the mobile device into the case member. the panel member preferably affixes to the case member using a sliding arrangement.

In a preferred embodiment, the panel member affixes to the rear of the peripheral hardware, leaving the major portion of it exposed for access and heat dissipation. When the panel member and case member are affixed, their arrangement brings the connectors of the mobile device adjacent to the connectors of the peripheral hardware, eliminating the need for long wires. Ideally, the opening is located at the rear of the case member, so it can be effectively closed by the panel member and peripheral device.

The engagement mechanism for the case member and panel member preferably comprises a sliding parallel rail system, wherein rails on the case member are adapted to surround and enclose the side edges of the panel member in a manner that the panel member may slide relative to the rails. In this rail and slot arrangement, the panel member may be slid onto the rails of the case member, effectively forming a back to the case member, and holding the mobile device adjacent the peripheral hardware. In one embodiment, the slots may be disposed on the case member with complimentary rails located on the panel member.

To facilitate a releasable locking configuration, in the connection of the rail arrangement of the case member and panel member, it is anticipated the rails will include a stop or slot designed to engage tabs on the panel member, allowing a user to easily slide the panel member to a final position. At the final position, a locking assembly, in one embodiment comprising a tab and groove assembly, creates a biased locking position that can be unlocked by sliding pressure. It is also contemplated that tabs will be placed in the slots or on the rails to facilitate stopping a sliding motion, due to a change in sliding pressure, at a predetermined position, for example, to slide the mobile device relative the peripheral hardware to expose a camera.

To ensure the closest fit between the audio player and audio amplifier, the panel member preferably comprises counter sunk attachment points for accommodating fastener heads. When the fasteners are fully engaged in the audio amplifier, the flat fastener heads present a smooth surface aligning with the surface of the panel member. The panel member may also comprise cut-outs for heat dissipation.

When the audio amplifier is installed in the apparatus adjacent the audio player, the panel member has edges within the boundaries of the periphery of the audio amplifier, such that the peripheral edges of the case member, which cover the corners of the audio player, are substantially similar in outer dimension to the audio amplifier.

DESCRIPTION

Figure 1:
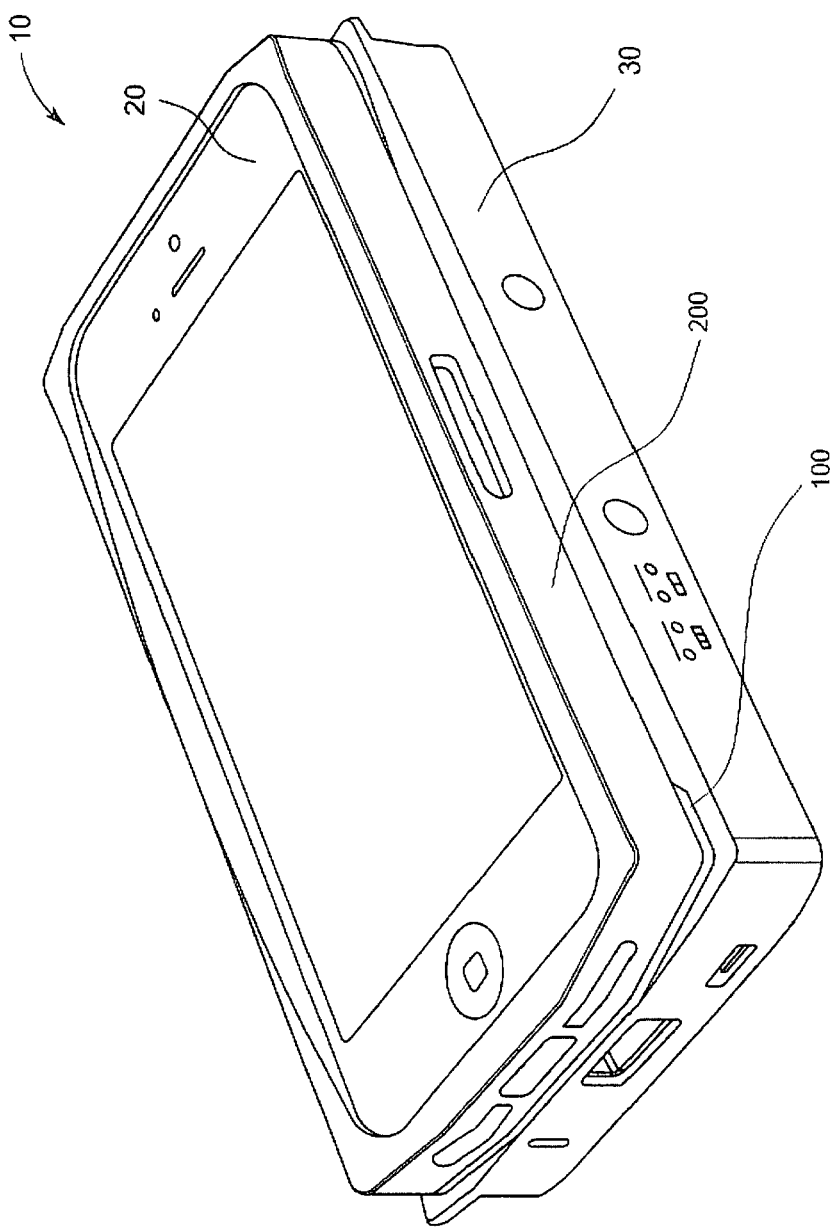
FIG. 1 is a perspective view of a headphone amplifier attachment, including a mobile device, case and amplifier.
Figure 2:
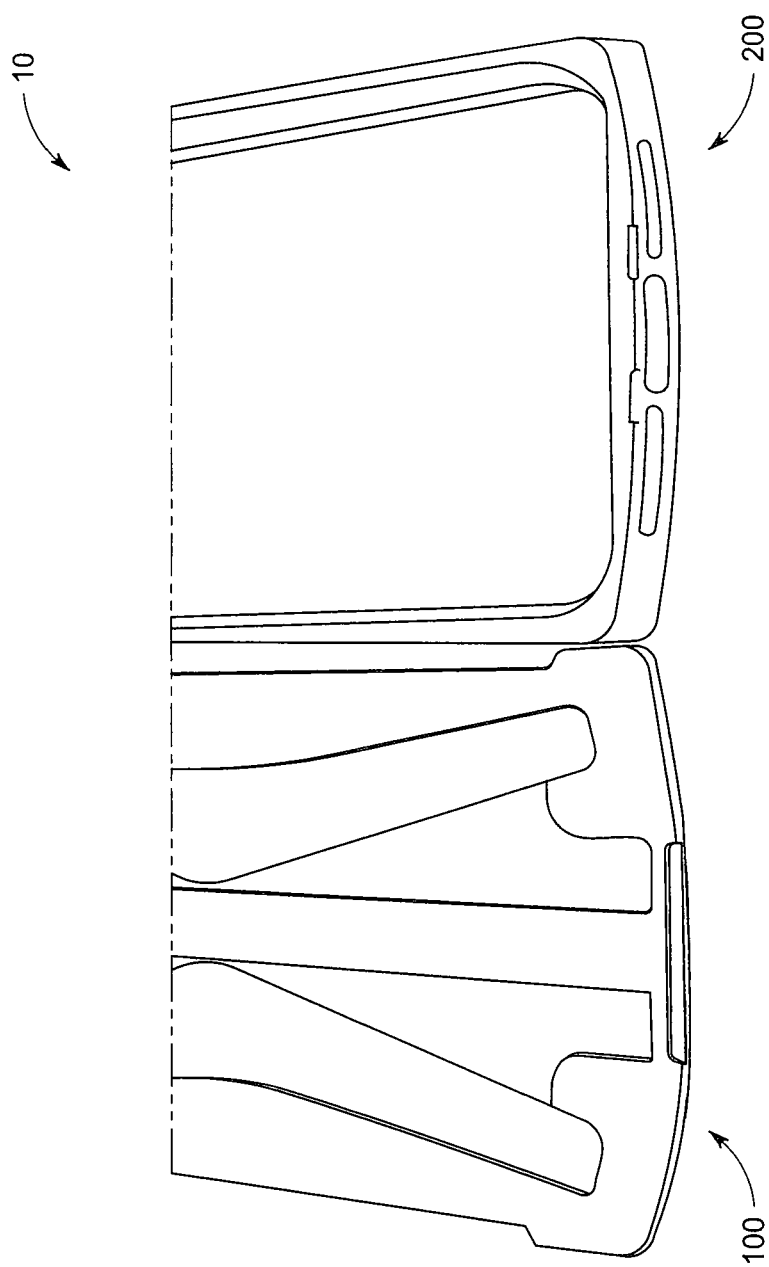
FIG. 2 is a top perspective view of the two components of the headphone amplifier attachment.

Referring to FIG. 1, a perspective view of a mobile device and peripheral hardware case 10 is shown. In the illustrated embodiment, the attachment includes a case for surrounding an audio player 20 in a manner typified by conventional cell phone cases. Although an audio player 20 comprising a cell phone is shown in the illustrated embodiment, any hand-held music playing device, including MP3 players and personal digital assistants are contemplated. The case 10 is also affixed to a headphone amplifier 30, which amplifies audio signal generated by the audio player 20. Referring to FIG. 2, a perspective view of a disassembled case 10 is shown. The case 10 comprises a panel member 100 and a case member 200, which connect to form the completed case 10.

Figure 3:
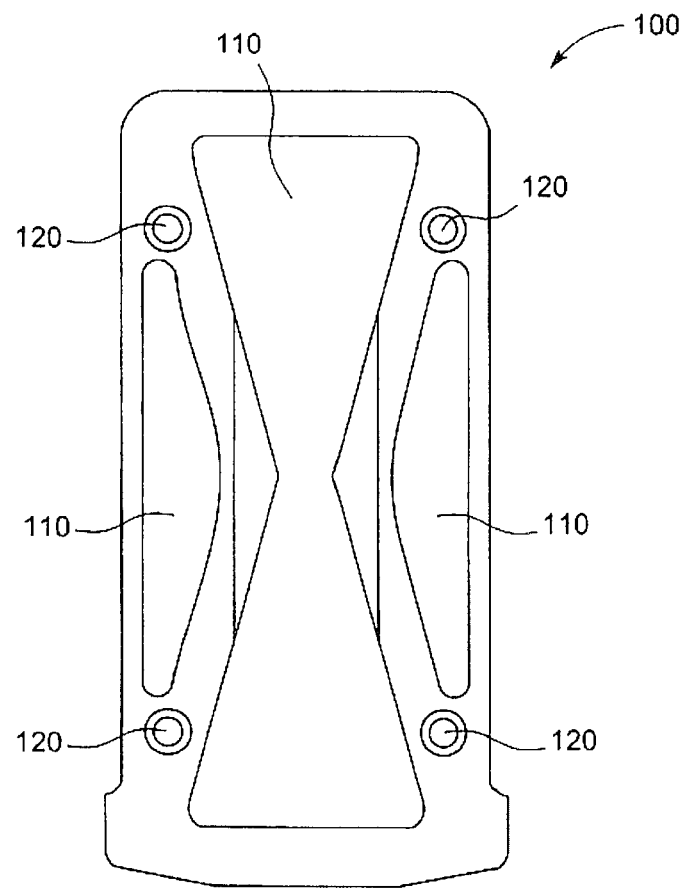
FIG. 3 is a plan view of a panel member adapted to attach to a headphone amplifier.

Referring to FIG. 3, the panel member 100 is substantially flat and rectangular, conforming to the shape of both an amplifier and audio player (not shown). In one preferred embodiment, the panel member 100 may comprise cut-outs 110, which provide for a lighter case 10 using less material, and also allowing the amplifier and cell phone to cool, thereby avoiding overheating. In one embodiment, the fast panel member 100 anchors to an amplifier using anchoring holes 120.

Figure 4:
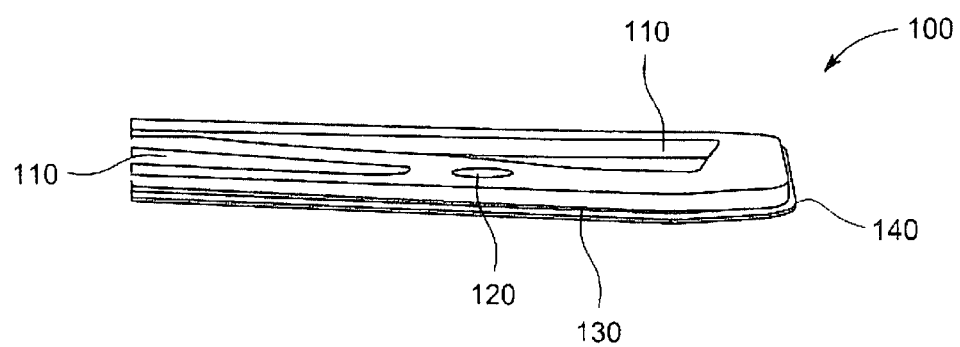
FIG. 4 is a side perspective view of a panel member adapted to attach to a headphone amplifier.
Figure 5:
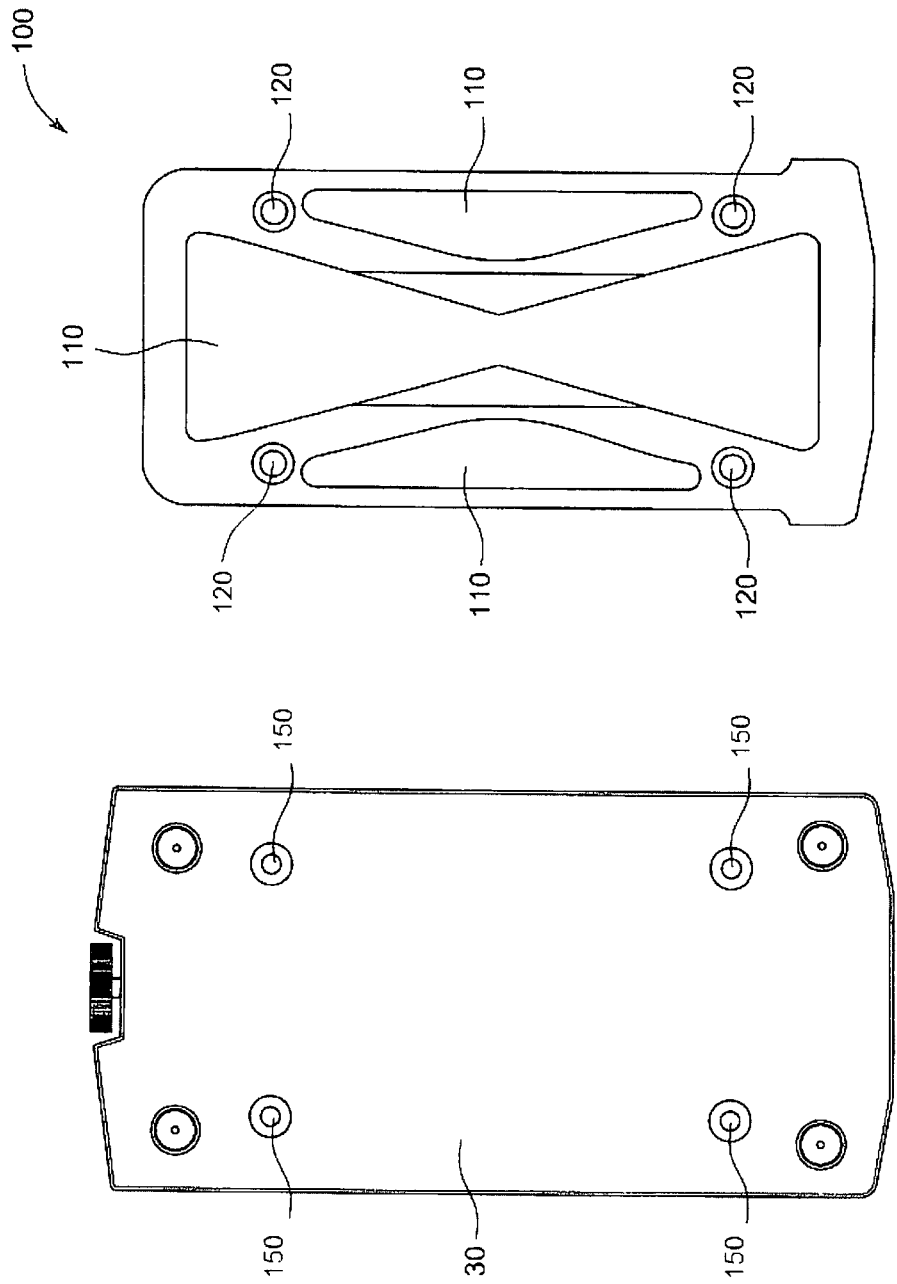
FIG. 5 is a plan view of a headphone amplifier and a panel member adapted to affix to the amplifier.
Figure 6:
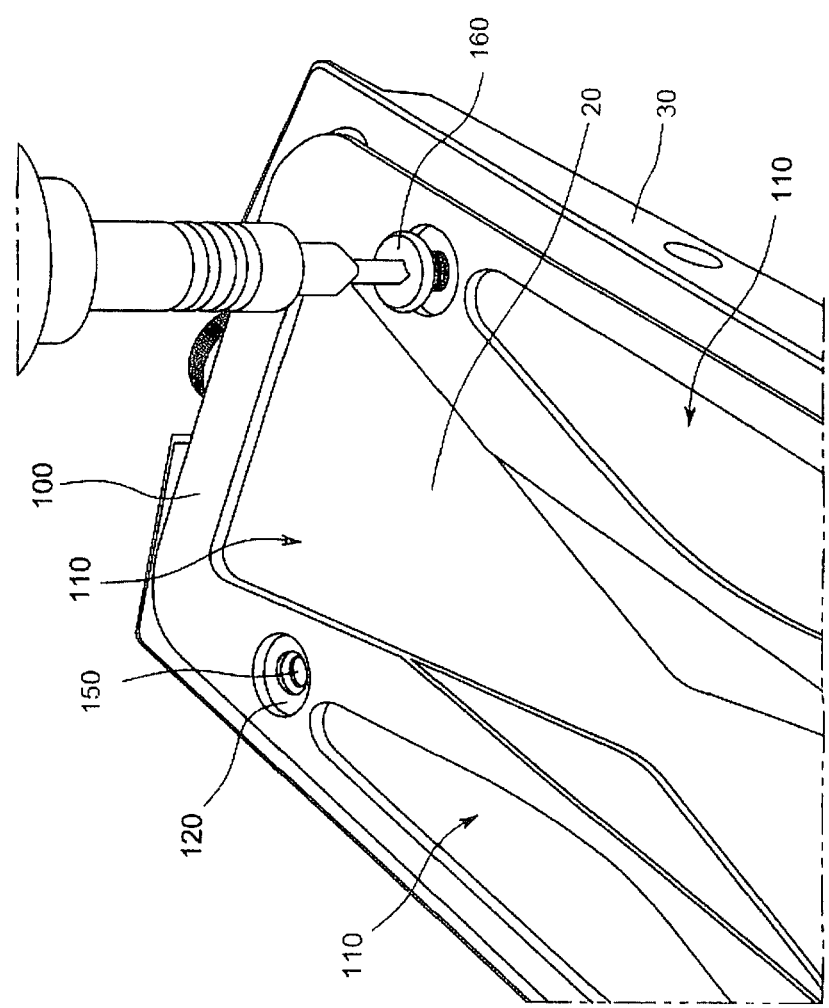
FIG. 6 is a perspective view of a panel member being affixed to a headphone amplifier.
Figure 7:
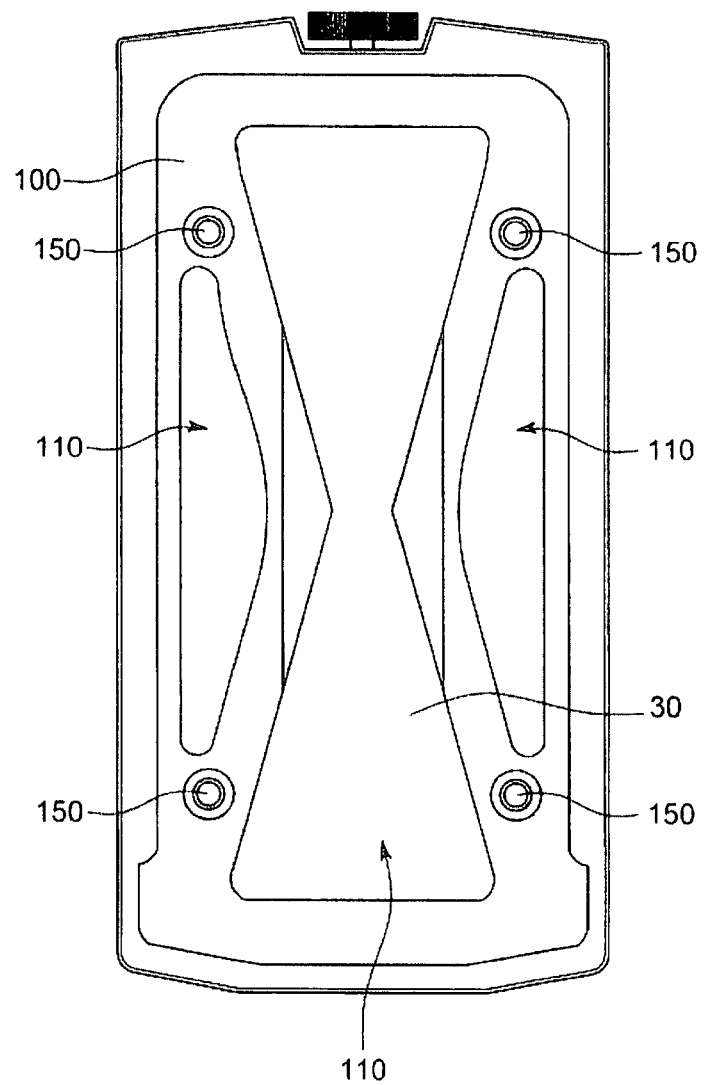
FIG. 7 is a plan view of a panel member affixed to a headphone amplifier.
Figure 11:
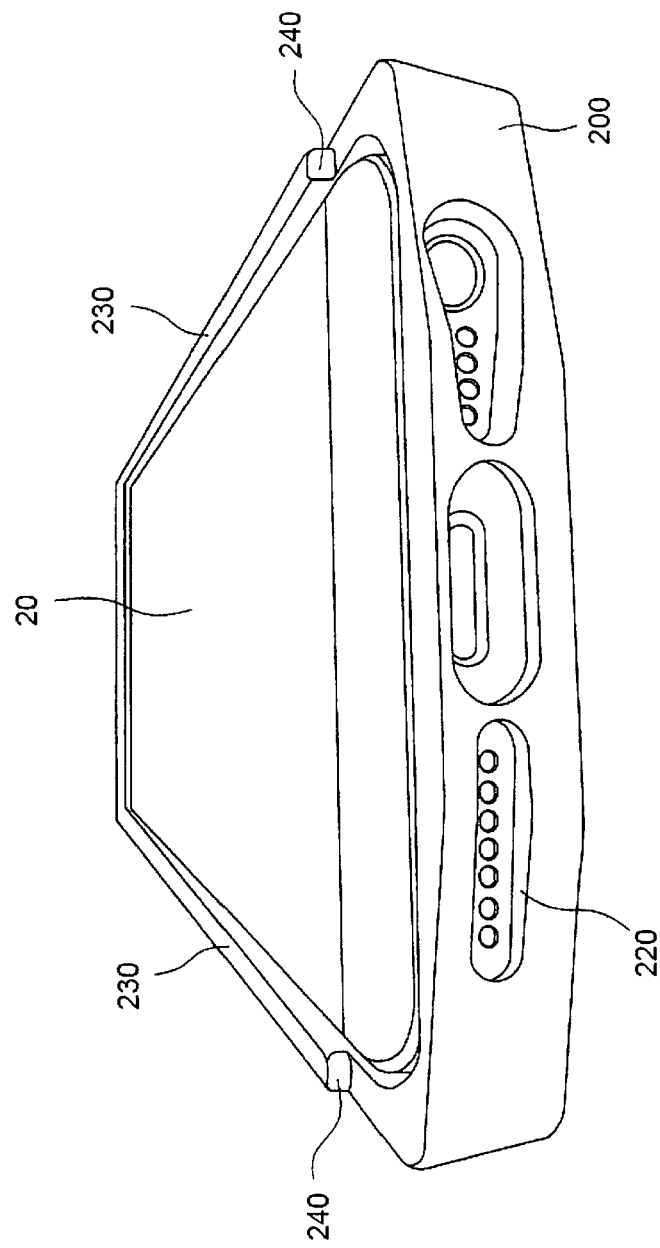
FIG. 11 is a side perspective view of an audio player affixed in an audio player case.
Figure 12:
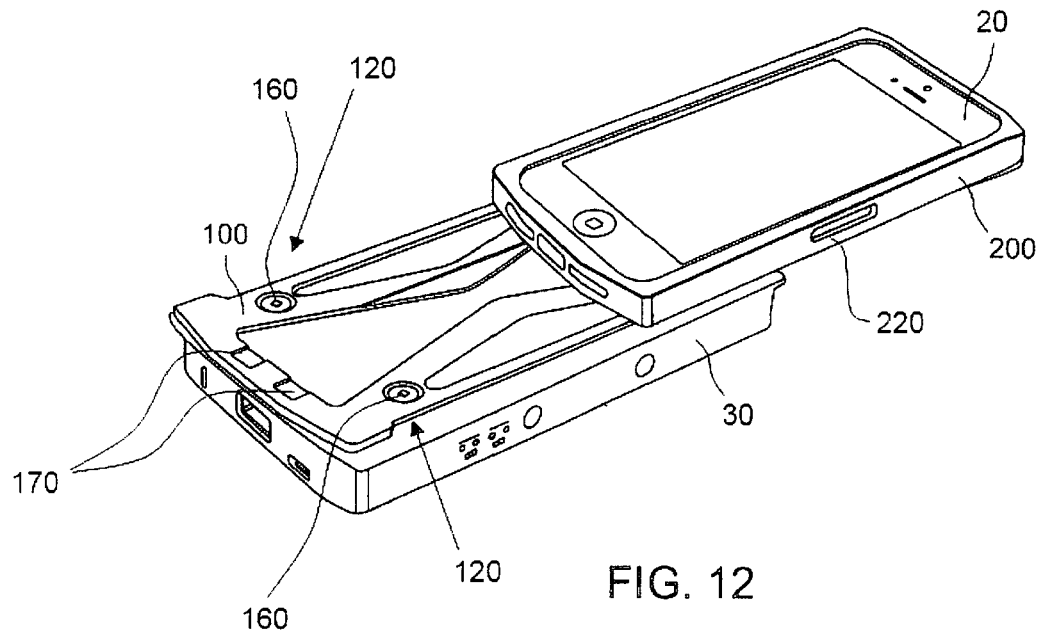
FIG. 12 is a perspective view of an audio player in an audio player case being affixed to a panel member and headphone amplifier.

Referring to FIG. 4, the panel member 100 also comprises a slot member 130 and a stop 140, which allows the panel member 100 to attach to the case member 200. Referring to FIG. 5, the holes 120 of the panel member 100 align with threaded holes 150 on the amplifier 30. Referring to FIGS. 6 and 7, in order to affix the panel member 100 to the amplifier 30, the anchoring holes 120 are aligned with the threaded holes 150, and screws 160 inserted therein. Although the illustrated embodiment shows screws 160, it is anticipated that any attachment means which securely anchors the panel member 100 to an amplifier 30 may be used. Additionally, the screws 160 and anchoring holes 120 may be adapted to provide a flush surface to the panel member 100 when installed. Referring to FIGS. 11 and 12, the panel member 100 also comprises a locking detent 170 designed to engage the case member 200.

Figure 8:
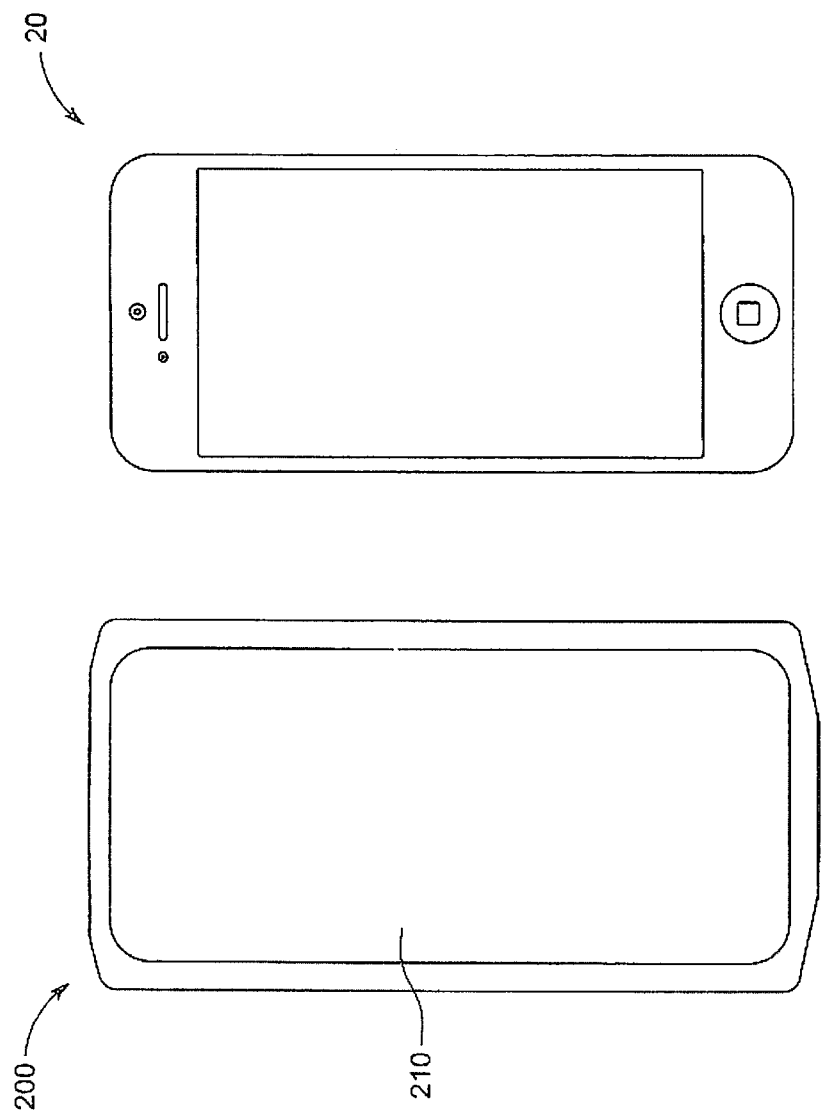
FIG. 8 is plan view of an audio player alongside an audio player case.
Figure 9:
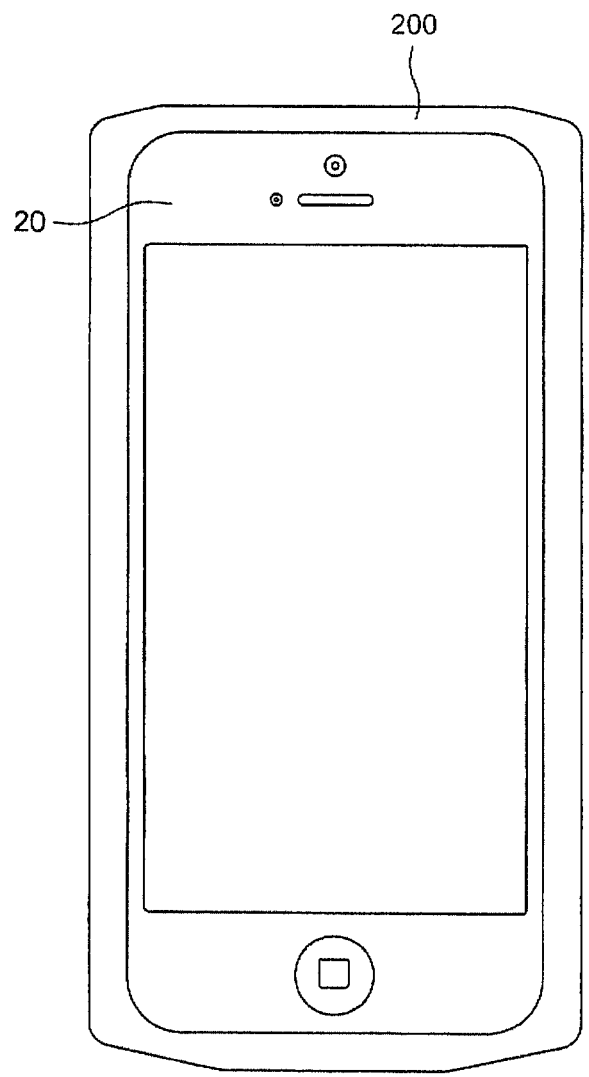
FIG. 9 is a plan view of an audio player affixed in an audio player case.
Figure 10:
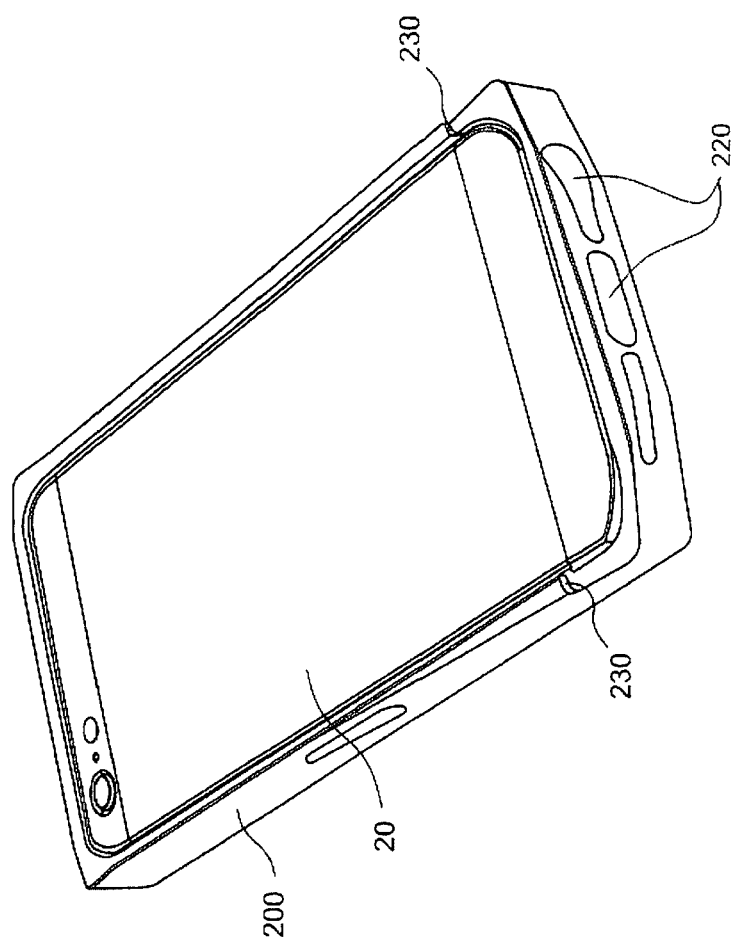
FIG. 10 is a perspective view of an audio player affixed in an audio player case.

Referring to FIG. 8, the case member 200 is substantially rectangular and adapted to function as a case for an audio player 20. Although the illustrated audio player is a cell phone, any type of handheld audio device, such as an MP3 player or personal digital assistant is contemplated. Referring to FIG. 9, preferably the case member 200 protects the audio player 20 by surrounding it in areas prone to damage, such as at the corners and sides, while allowing access to the face of the audio player 20 for user control. Referring to FIG. 10, the case member 200 preferably comprises access ports 220 in areas covered by the case member 200. The access ports 220 allow the audio player, particularly in the case of a cell phone, or other multi-function electronic device, to remain fully operational while in the case member 200.

Referring to FIG. 11, the case member 200 is shown in close-up perspective view. On the side of the case member 200 opposite the face of the audio player 20, two rails 230 are disposed on either side of the case member 200. The rails 230 are adapted to engage the slots 130 of the panel member 100 and prevent the panel member 100 from sliding further against the case member 200 once the rails 230 engage additional stops 240 on the panel member 100 (See FIG. 4).

Figure 13:
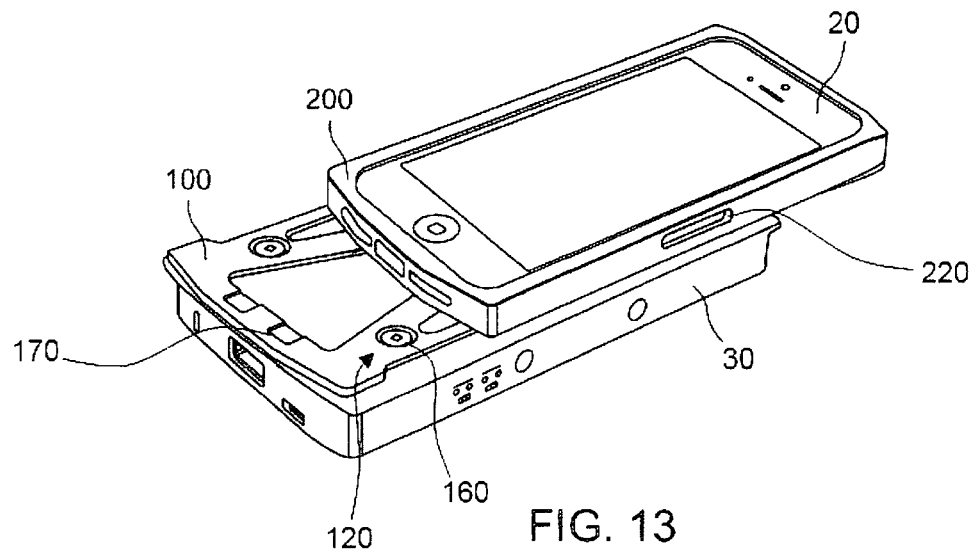
FIG. 13 is a perspective view of an audio player in an audio player case being affixed to a panel member and headphone amplifier.
Figure 14:
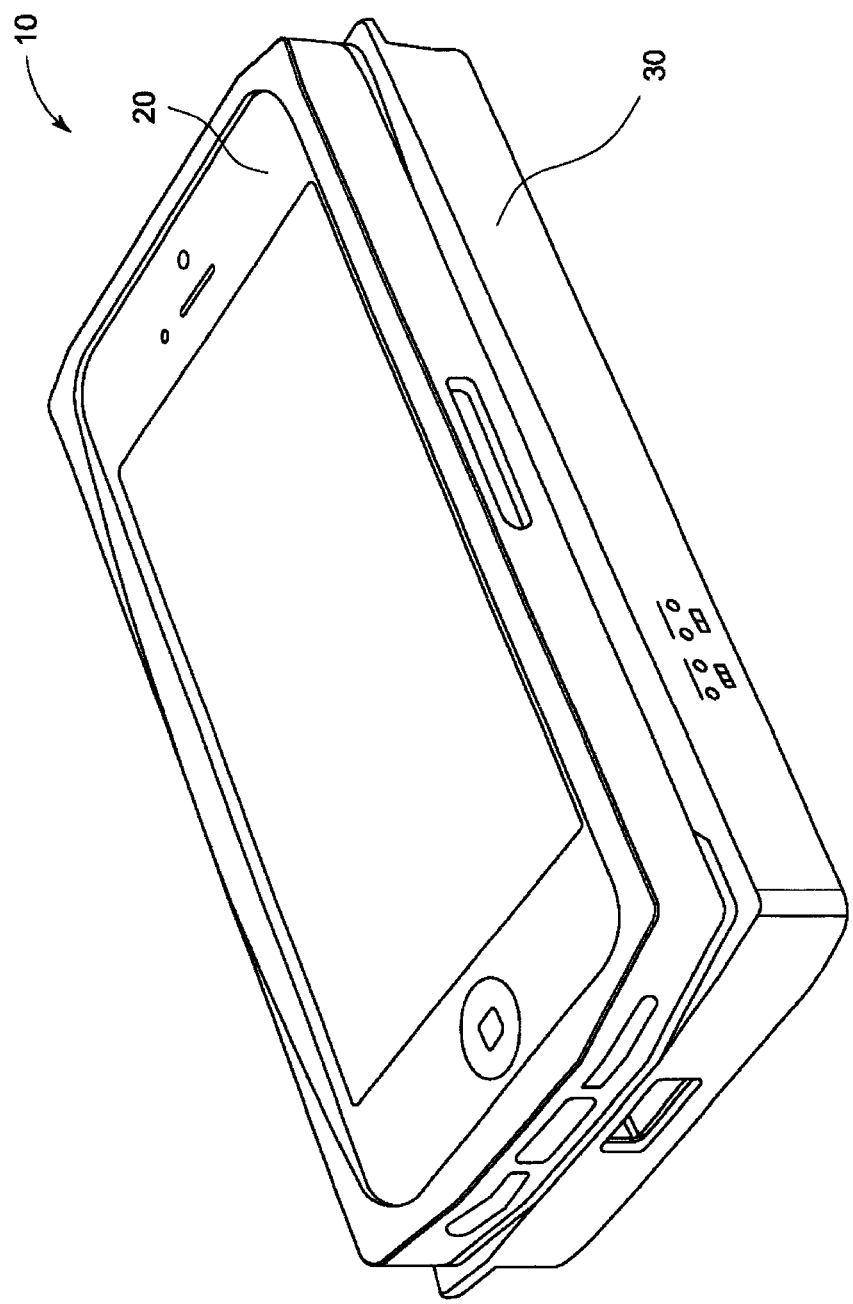
FIG. 14 is a perspective view of a battery pack attachment, including a mobile device, case and battery pack.

Referring to FIGS. 12 and 13, the mobile device and peripheral hardware case 10 is shown being assembled for use. To prepare the amplifier 30, a user attaches the panel member 100 to an amplifier 30 using the anchoring holes 120 and screws 160. To prepare the audio player 20, the user attaches the case member 200 to the audio player 20, ensuring that the controls for the audio player are accessible through the access ports 220. Thereafter, the panel member 100 is slid against the case member 200, such that the slots 130 engage the rails 230. As the stops 140 on the panel member 100 engage the rails 230, case member 200 clicks into the locking detents 170 on the panel member 100. In this manner the panel member 100 and case member 200 are substantially locked together, holding the audio player 20 adjacent the amplifier 30.

In order to separate the audio player 20 from the amplifier 30, a user simply presses down on the area of the panel member 100 adjacent the locking detents 170, thereby disengaging the case member 200, and slides the slots 130 out from under the rails 230. In one preferred embodiment, the locking detent 170 may be finger accessible for easily unlocking the case 10.

The foregoing description is sufficient in detail to enable one skilled in the art to make and use the invention. It is understood, however, that the detail of the preferred embodiments presented is not intended to limit the scope of the invention. For instance, the panel member may be incorporated into an amplifier, and the case member may attach to an audio player without surrounding it in the manner of a cell phone case. Therefore equivalents thereof and other modifications which come within the scope of the invention as defined by the claims will become apparent to those skilled in the art upon reading this specification.

What is claimed is:

1. A mobile device case for attaching to a peripheral hardware, the mobile device case comprising:
    a case member partially enclosing a mobile device;
    a panel member affixed to a peripheral hardware;
    the case member comprising mobile device control access portals, and rails adjacent an opening;
    the opening sized to allow the mobile device ingress into and egress from the case member; and
    wherein the panel member comprises slots complimentary to the rails, thereby allowing the panel member to affix to the case member using a sliding movement.

2. The apparatus of claim 1 wherein the opening is adjacent a rear side of the mobile device.

3. The apparatus of claim 1 wherein the slots comprise parallel slots are disposed on the panel member and the rails complimentary to the slots are disposed on the case member.

4. The apparatus of claim 1, wherein the panel member includes tabs impinging on the rails when the panel member is fully inserted into the case member.

5. The apparatus of claim 1 further comprising a locking assembly having a tab and a groove biased to releasably lock the panel member to the case member.

6. The apparatus of claim 1 wherein the panel member comprises a counter sunk attachment point for accommodating a screw.

7. The apparatus of claim 1 wherein the panel member comprises cut-outs between the slots for heat dissipation.

8. An apparatus for attaching a panel member to a mobile device, comprising:

a case member adapted to partially enclose the mobile device and having parallel rails to engage a panel member;

the panel member adapted to affix to a peripheral hardware, and having sides engaging the rails;

wherein the case member comprises access portals for accessing the mobile device;

wherein the panel member affixes to a rear side of the peripheral hardware; and further comprising a tab and groove mechanism for releasably locking the panel member against the case member, such that the tab and groove mechanism lock the panel member relative to the case member when a stop on the panel member engages a rail on the case member.

9. The apparatus of claim 8 wherein the panel member comprises counter sunk attachment points for accommodating a screw.

* * * * *